United States Patent
Abe et al.

(10) Patent No.: US 9,515,557 B2
(45) Date of Patent: Dec. 6, 2016

(54) STEP-UP STEP-DOWN CONVERTER DEVICE

(71) Applicant: HITACHI INFORMATION & TELECOMMUNICATION ENGINEERING, LTD., Yokohama-shi, Kanagawa-ken (JP)

(72) Inventors: Kosuke Abe, Kanagawa-ken (JP); Fumikazu Takahashi, Kanagawa-ken (JP)

(73) Assignee: HITACHI INFORMATION & TELECOMMUNICATION ENG., LTD., Yokohama-Shi (JP)

( * ) Notice: Subject to any disclaimer, the term of this patent is extended or adjusted under 35 U.S.C. 154(b) by 48 days.

(21) Appl. No.: 14/637,747

(22) Filed: Mar. 4, 2015

(65) Prior Publication Data

US 2015/0263608 A1  Sep. 17, 2015

(30) Foreign Application Priority Data

Mar. 14, 2014  (JP) ................................. 2014-051213

(51) Int. Cl.
*H02M 3/158* (2006.01)

(52) U.S. Cl.
CPC .................................. *H02M 3/1582* (2013.01)

(58) Field of Classification Search
CPC .. H02M 3/1582; H02M 3/145; H02M 3/155; H02M 3/157; H02M 3/156; H02M 3/1588; H02M 2001/0009
USPC ........................................ 323/259, 344, 283
See application file for complete search history.

(56) References Cited

U.S. PATENT DOCUMENTS

| | | | | |
|---|---|---|---|---|
| 6,166,527 A | * | 12/2000 | Dwelley | H02M 3/1582 323/222 |
| 6,191,567 B1 | * | 2/2001 | Sluijs | H02M 3/1582 323/259 |
| 6,788,033 B2 | * | 9/2004 | Vinciarelli | H02M 3/1582 323/225 |
| 7,202,644 B2 | * | 4/2007 | Nitta | H02M 3/1582 323/224 |
| 7,242,168 B2 | * | 7/2007 | Muller | H02M 3/1582 323/222 |
| 7,391,189 B2 | * | 6/2008 | Nitta | H02M 3/1582 323/259 |
| 7,768,245 B1 | * | 8/2010 | De Cremoux | H02M 3/156 323/225 |
| 7,994,762 B2 | * | 8/2011 | de Cremoux | H02M 3/1582 323/271 |
| 8,860,384 B2 | * | 10/2014 | Chen | H02M 3/1582 323/222 |

(Continued)

*Primary Examiner* — Gary L Laxton
*Assistant Examiner* — Kyle J Moody
(74) *Attorney, Agent, or Firm* — R. Neil Sudol; Henry D. Coleman

(57) ABSTRACT

In a step-up step-down converter device, a diode is connected in parallel to a switch connecting a positive pole side and a negative pole side for stepping up and stepping down an input voltage, a diode is connected in parallel to a switch in a positive pole side of a closed circuit constructed between an input direct voltage and an output side load, and a control circuit detecting an output voltage generates $1^{st}$ Phase PWM and $2^{nd}$ Phase PWM obtained by logically adding and multiplying two difference values having phase difference in comparison with a triangle waveform signal which is 180 degrees different in phase from an error signal based on a difference value between the output voltage and a target reference voltage, and alternately turns on and off switches respectively by using $1^{st}$ Phase PWM or $2^{nd}$ Phase PWM at the step-down or step-down operation time.

3 Claims, 11 Drawing Sheets

(56) References Cited

U.S. PATENT DOCUMENTS

| | | | |
|---|---|---|---|
| 9,112,403 B2* | 8/2015 | Hallak | H02M 3/1582 |
| 2009/0102440 A1 | 4/2009 | Coles | |
| 2011/0006743 A1* | 1/2011 | Fabbro | H02M 3/1582 |
| | | | 323/282 |
| 2014/0266085 A1* | 9/2014 | Unno | H02M 3/04 |
| | | | 323/234 |

* cited by examiner

STEP-UP STEP-DOWN CONVERTER DEVICE

BACKGROUND OF THE INVENTION

1. Field of the Invention

The present invention related to a step-up step-down converter device which steps up or steps down an output voltage of a power supply facility having a fluctuated input voltage in a supply side of a photovoltaic power generation to a predetermined voltage so as to output, and more particularly to a step-up step-down converted device which can prevent reduction of power generation efficiency due to a dead zone generated at the step-up and step-down switching time on the basis of natural energy by a simple circuit structure.

2. Description of the Conventional Art

Since the solar panel voltage is widely changed according to the number of serial connections and the amount of received light in the power supply facility in which the supply power for the photovoltaic power generation is generally changed, a step-up step-down converter device is provided for stepping up or stepping down the input voltage to the predetermined voltage so as to output. For example, as shown in FIG. 9, a step-up step-down converter device 710 according to a prior art is connected to a solar panel 700 which generates electric power having direct voltage 0 V to 600 V by solar light, and is structured such as to step up and step down the voltage between 0 V and 600 V output from the solar panel 700 to a range between 0 V and 400 V so as to output.

The step-up step-down converter device is provided, as shown in FIG. 10, with two connection circuits which connect in series a switch A, an inductor and a switch D to a positive pole side of a closed circuit which is constructed between an input direct voltage Vin by the solar panel and an output side load RL, and connect a positive pole side circuit and a negative pole side circuit of the closed circuit via a capacitor C1 or C2, a connection circuit which connects from between the switch A and the inductor to the negative pole side circuit via a switch V, a connection circuit which connects from between the inductor and the switch D to the negative pole side circuit via a switch C, and a control circuit 8 which controls opening and closing of the switches A to D, and is structured such as to step up and step down the electric voltage output from the solar panel to the predetermined range by controlling the opening and closing of the switches A to D.

In the device mentioned above, since the voltage step-up operation and the voltage stepping down operation switch the value of the input voltage to the original one, there is generated a dead zone which can not be controlled due to a voltage detection error, a desired operation can not be obtained in the vicinity of the voltage, and there is generated a problem that the power generation efficiency is lowered.

In order to solve the problem mentioned above, a technique in patent document 1 has been proposed. The device employing the technique is provided, as shown in FIG. 11, with two connection circuits which connect in series a switch A, an inductor and a switch D to a positive pole side of a closed circuit which is constructed between an input direct voltage Vin by the solar panel and an output side load, and connect a positive pole side circuit and a negative pole side circuit of the closed circuit via a capacitor C1 or C2, a connection circuit which connects from between the switch A and the inductor to the negative pole side circuit via a switch V, a connection circuit which connects from between the inductor and the switch D to the negative pole side circuit via a switch C, and a control circuit 80 which controls opening and closing of the switches A to D, and is structured such that the control circuit 80 controls to open and close the switches A to D in response to the output voltage of the output load, thereby stepping up or stepping down the electric voltage output from the solar panel to the predetermined range so as to output.

The control circuit 80 is structured such as to be provided with a comparator a which inputs a detection voltage between a resistance R1 and a resistance R2 connected to the output voltage Vout supplied to the output side load as Vfb to a negative terminal, inputs a target voltage Vref to a positive terminal, and compares the detection voltage Vfb with the target voltage Vref so as to output an on-off signal VEA1, a comparator b which inputs the on-off signal VEA1 of the comparator a to the negative terminal, inputs a predetermined voltage Vp to the positive terminal, and compares the on-off signal VEA1 with the predetermined voltage Vp so as to output an on-off signal VEA2, a comparator c which inputs the on-off signal VEA1 to the negative terminal, inputs a predetermined voltage VY to the positive terminal, and compares the on-off signal VEA1 with the predetermined voltage VY so as to output an on-off signal VEA3, a circuit element e which selectively switches the on-off operation of the switches A and B on the basis of the on-off signal VEA3 from the comparator c, a comparator d which inputs a signal obtained by reversing the predetermined voltage VY at 180 degrees to the positive terminal, inputs the on-off signal VAE2 from the comparator b to the negative terminal, and compares the both so as to output an on-off signal VEA4, and a circuit element f which selectively switches the on-off operation of the switches C and D on the basis of the on-off signal VEA4 from the comparator d.

In the step-up step-down converter device structured as mentioned above, the control circuit 80 monitors the output voltage Vout supplied to the output side load in relation to the target voltage (for example, 400 V), and switches the step-down operation and the step-up operation so as to step down voltage in the case that the output voltage Vout is higher than the input voltage and step up voltage in the case that the output voltage Vout is lower than the input voltage. As a result, the step-up step-down converter operates to step up and step down the output voltage to a predetermined range (0 V to 400 V) so as to output without generation of the dead zone in principle at the switching time of the step-up and step-down operations.

PRIOR ART DOCUMENT

Patent Document

Patent Document 1: U.S. Patent Application Publication No. 2009-102440

SUMMARY OF THE INVENTION

Problem to be Solved by the Invention

A technique described in the patent document 1 mentioned above is structured such as to monitor an output voltage and step up and step down the output voltage to a predetermined range so as to output, and any dead zone is not generated in the switching operation of the step-down operation and the step-up operation in the case that the input voltage changed in the vicinity of the target voltage such as the solar power generation, however, there has been a problem that a circuit size is complicated, for example, necessity of an inverting amplifier circuit and a reference signal generating circuit.

An object of the present invention is to solve the problem in the prior art mentioned above, and to provide a step-up step-down converter device which can prevent reduction of a power generation efficiency caused by a dead zone generated at the step-up and step-down switching time on the basis of the natural energy by a simpler circuit structure.

Means for Solving the Problem

In order to achieve the object mentioned above, the invention according to a first aspect is a step-up step-down converter device comprising:

a switch circuit portion which steps up and steps down an input voltage by switching on-off operations of a plurality of switches for stepping up voltage and a plurality of switches for stepping down voltage so as to output; and a control circuit which switches and controls the step-up and step-down operation by the switch circuit portion on the basis of an error signal obtained by comparing the input voltage or the output voltage of the switch circuit portion with a reference signal, wherein the control circuit is provided with a first oscillation circuit which outputs a first triangle waveform signal, and a second oscillation circuit which outputs a second triangle waveform signal having a phase which is 180 degrees different from the first triangle waveform signal, generates a step-down pulse signal and a step-up pulse signal in which a duty ratio is defined by the first triangle waveform signal and the second triangle waveform signal, and controls so as to turn on and off a plurality of switches of the switch circuit portion on the basis of the generated step-down pulse signal and step-up pulse signal.

The invention according to a second aspect is a step-up step-down converter device comprising:

two connection circuits which connect in series a first switch A, an inductor and a parallel circuit of a fourth switch D and a second diode D2 to a positive pole side of a closed circuit constructed between a fluctuating input direct voltage and an output side load, and connect a positive pole side circuit and a negative pole side circuit of the closed circuit via a first or second capacitor C1 or C2;

a connection circuit which connects from between the first switch A and the inductor to the negative pole side circuit via a parallel circuit of a second switch B and a first diode D1;

a connection circuit which connects from between the inductor and the fourth switch D to the negative pole side circuit via a third switch C;

a control circuit which is connected to the output side load and controls to turn on and off the first to fourth switches; and the control circuit stepping up and stepping down the input direct voltage to a predetermined range so as to output by monitoring an output voltage of the output side load and controlling to turn on and off the first to fourth switches, wherein the control circuit comprises:

a first amplifier which inputs an output voltage Vout supplied to the output side load to a negative terminal, inputs a target output voltage Vref coming to a reference signal to a positive terminal, and amplifies a difference value between the output voltage Vout and the target output voltage so as to output as an error signal;

a first oscillation circuit which outputs a first triangle waveform signal;

a first comparator which inputs the error signal output from the first amplifier to the positive terminal, inputs the first triangle waveform signal from the first oscillation circuit to the negative terminal, and compares the error signal with the first triangle waveform signal so as to output a pulse signal;

a second oscillation circuit which outputs a second triangle waveform signal having a phase which is 180 degrees different from the first triangle waveform;

a second comparator which inputs the error signal output from the first amplifier to the positive terminal, inputs the second triangle waveform signal from the second oscillation circuit to the negative terminal, and compares the error signal with the second triangle waveform signal so as to output a pulse signal;

a logic element which inputs the pulse signals output from the first comparator and the second comparator, and outputs a logical add of both the signals as a first pulse modulation signal;

a negator which outputs a second switch signal obtained by inverting the first pulse modulation signal output from the logic element;

an AND gate which outputs AND of both the signals as a third switch signal; and a negator which inverts the first pulse modulation signal output from the AND gate and outputs as a fourth switch signal, and wherein the control circuit sets the first pulse modulation signal to a control signal for turning on and off the first switch, sets the second switch signal to a control signal for turning on and off the second switch, sets the second pulse modulation signal to a control signal for controlling the third switch, and sets the fourth switch signal to a control signal for turning on and off the fourth switch, turns off the third switch and turns on the fourth switch as well as alternately turning on and off the first switch and the second switch at the step-down operation time, and alternately turning on and off the third switch and the fourth switch as well as turning on the first switch and turning off the second switch at the step-up operation time.

The invention according to a third aspect is a step-up step-down converter device comprising:

two connection circuits which connect in series a first switch A, an inductor and a parallel circuit of a fourth switch D and a second diode D2 to a positive pole side of a closed circuit constructed between a fluctuating input direct voltage and an output side load, and connect a positive pole side circuit and a negative pole side circuit of the closed circuit via a first or second capacitor C1 or C2;

a connection circuit which connects from between the first switch A and the inductor to the negative pole side circuit via a parallel circuit of a second switch B and a first diode D1;

a connection circuit which connects from between the inductor and the fourth switch D to the negative pole side circuit via a third switch C;

a control circuit which is connected to a current sensor detecting an electric current of the input direct voltage and controls to turn on and off the first to fourth switches A to D; and the control circuit stepping up and stepping down the input direct voltage to a predetermined range so as to output by monitoring an input voltage and controlling to turn on and off the first to fourth switches A to D, wherein the control circuit comprises:

an amplifier which inputs a detection current detected by the current sensor to a negative terminal, inputs a target output voltage coming to a reference signal to a positive terminal, and amplifies a difference value between the detection current and the target output voltage so as to output as an error signal;

a first oscillation circuit which outputs a first triangle waveform signal;

a first comparator which inputs the error signal output from the amplifier to the positive terminal, inputs the first triangle waveform signal from the first oscillation circuit to the negative terminal, and compares the error signal with the first triangle waveform signal so as to output a pulse signal;

a second oscillation circuit which outputs a second triangle waveform signal having a phase which is 180 degrees different from the first triangle waveform;

a second comparator which inputs the error signal output from the amplifier to the positive terminal, inputs the second triangle waveform signal from the second oscillation circuit to the negative terminal, and compares the error signal with the second triangle waveform signal so as to output a pulse signal;

a logical add element which inputs the pulse signals output from the first comparator and the second comparator, and outputs a logical add of both the signals as a first pulse modulation signal;

a first negator which outputs a second switch signal obtained by inverting the first pulse modulation signal output from the logical add element;

an AND gate which inputs difference signals output from the first comparator and the second comparator and outputs AND of both the difference signals as a third switch signal; and a negator which outputs a fourth signal obtained by inverting the third signal output from the AND gate, and wherein the control circuit sets the first pulse modulation signal to a control signal for turning on and off the first switch, sets the second switch signal to a control signal for turning on and off the second switch, sets the second pulse modulation signal to a control signal for controlling the third switch, and sets the fourth switch signal to a control signal for turning on and off the fourth switch, turns off the third switch and turns on the fourth switch as well as alternately turning on and off the first switch and the second switch at the step-down operation time, and alternately turning on and off the third switch and the fourth switch as well as turning on the first switch and turning off the second switch at the step-up operation time.

Effect of the Invention

The step-up step-down converter device according to the present invention is provided with the switch circuit portion which steps up and steps down the input voltage by switching on-off operations of a plurality of switches for stepping up voltage and a plurality of switches for stepping down voltage so as to output, and the control circuit which switches and controls the step-up and step-down operation by the switch circuit portion on the basis of the error signal obtained by comparing the input voltage or the output voltage of the switch circuit portion with the reference signal, and the control circuit is provided with the first oscillation circuit which outputs the first triangle waveform signal, and the second oscillation circuit which outputs the second triangle waveform signal having the phase which is 180 degrees different from the first triangle waveform signal, generates the step-down pulse signal and the step-up pulse signal in which the duty ratio is defined by the first triangle waveform signal and the second triangle waveform signal, and controls so as to turn on and off a plurality of switches of the switch circuit portion on the basis of the generated step-down pulse signal and step-up pulse signal. As a result, it is possible to prevent the reduction of the power generation efficiency due to the dead zone by the simple circuit structure.

Further, the step-up step-down converter device according to the present invention connects in parallel a forward diode to the second switch which connects the positive pole side and the negative pole side for stepping up and stepping down the input voltage and connects in parallel the forward diode to the fourth switch in the positive pole side of the closed circuit which is constructed between the input direct voltage and the output side load, and the control circuit detecting the output voltage or the input current generates the first pulse modulation signal obtained by logically adding and logically multiplying two pulse signals having the phase difference in comparison with the triangle waveform signal which is 180 degrees different in phase from the error signal on the basis of the difference value between the output voltage or the input current and the target reference voltage or the target reference current, and the second pulse modulation signal which is different in phase from the first pulse modulation signal, alternately turns on and off the first switch and the second switch by using the first pulse modulation signal at the step-down operation time, and alternately turns on and off the third switch and the fourth switch by using the second pulse modulation signal at the step-up operation time. As a result, it is possible to prevent the reduction of the power generation efficiency due to the dead zone by the simple circuit structure.

DETAILED DESCRIPTION OF PREFERRED EMBODIMENTS

A description will be in detail given below of an embodiment of a step-up step-down converter method and device to which a step-up step-down converter method according to the present invention is applied with reference to the accompanying drawings.

First Embodiment

Figure 1:
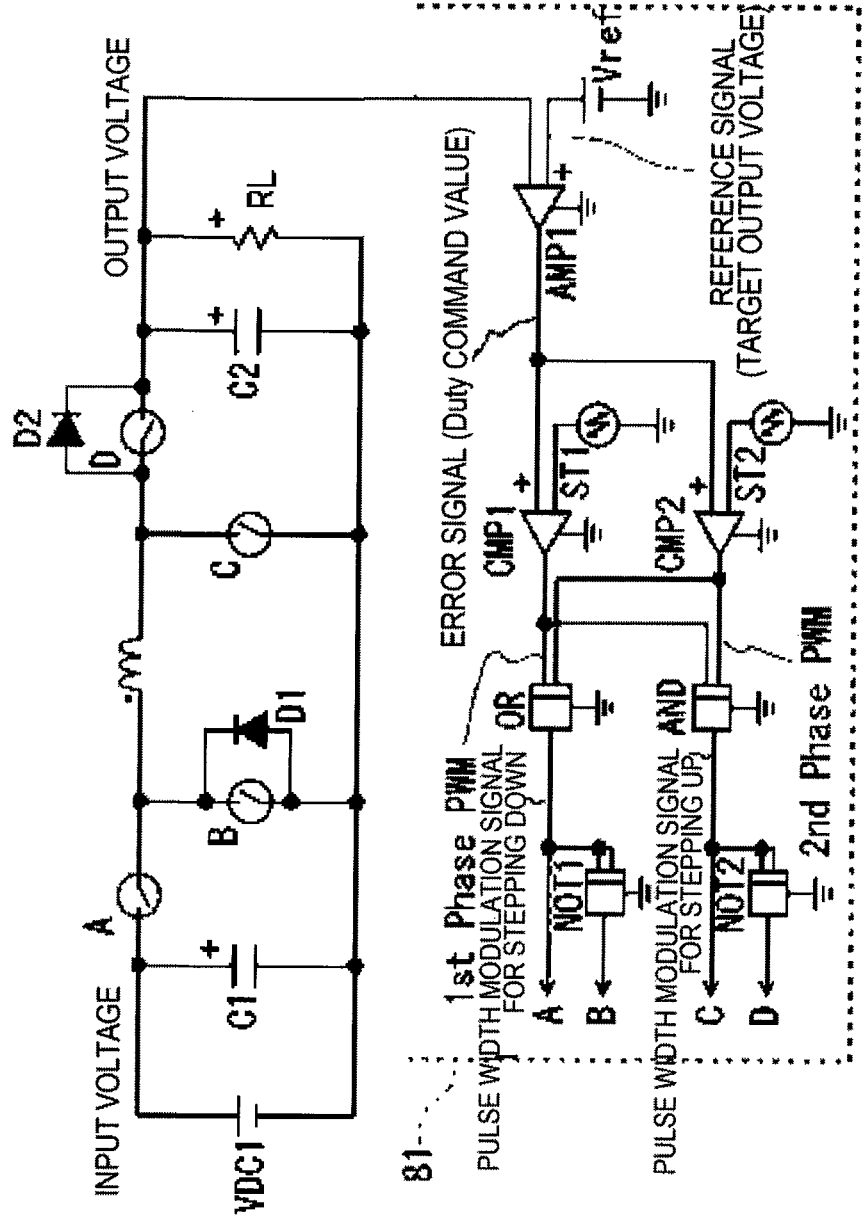
FIG. 1 is a configuration diagram of a step-up step-down converter device at the electric voltage controlling time according to a first embodiment of the present invention.

A step-up step-down converter device according to a first embodiment of the present invention is structured such as to monitor an output voltage and keep the output voltage within a predetermined range, is provided with two connection circuits which connect in series a switch A, an inductor and a parallel circuit of a switch D and a diode D2 to a positive pole side of a closed circuit constructed between an input direct voltage VDC1 by a solar panel and an output side load, and connect a positive pole side circuit and a negative pole side circuit of the closed circuit via a capacitor C1 or C2, a connection circuit which connects from between the switch A and the inductor to the negative pole side circuit via a parallel circuit of a switch B and the diode D1, a switch circuit portion having a connection circuit which connects from between the inductor and the switch D to the negative pole side circuit via a switch C, and a control circuit 81 which is connected to an output side load RL of the switch circuit portion and controls to open and close the switches A to D, as shown in FIG. 1, and is structured such that the control circuit 81 steps up and steps down the input voltage output from the solar panel to a predetermined range so as to output by monitoring the output voltage of the output side load RL and controlling to open and close the switches A to D.

The control circuit 81 is provided with a difference amplifier AMP1 which inputs an output voltage Vout supplied to an output side load RL to a negative terminal, inputs a target output voltage Vref coming to a reference signal to a positive terminal, and outputs a difference value between the output voltage Vout and the target output voltage Vref as an amplified error signal (Duty command value), an oscillation circuit ST1 which outputs a first triangle waveform (a saw tooth wave) signal, a comparator CMP1 which inputs the error signal (Duty command value) output from the difference amplifier AMP1 to the positive terminal, inputs the first triangle waveform signal from the oscillation circuit ST1 to the negative terminal, and outputs a pulse signal ($1^{st}$ Phase PWM) defining a duty ratio so that the difference between the error signal and the reference signal comes to zero by comparing the error signal (Duty command value) with the first triangle waveform signal, an oscillation circuit ST2 which outputs a second triangle waveform signal which is 180 degrees different in phase from the first triangle waveform signal, a comparator CMP2 which inputs the error signal (Duty command value) output from the difference amplifier AMP1 to the positive terminal, inputs the second triangle waveform signal from the oscillation circuit ST2 to the negative terminal, and outputs a pulse signal ($2^{nd}$ Phase PWM) defining a duty ratio so that the difference between the error signal and the reference signal comes to zero by comparing the error signal (Duty command value) with the second triangle waveform signal, a logical add element OR which inputs the pulse signal output from the comparator CPM1 and the comparator CMP2, and outputs logical adds of both the signals as a pulse width modulation signal for stepping down which is a switch signal A, a negator NOT1 which outputs a switch signal B obtained by inverting the pulse width modulation signal for stepping down which is output from the logical add element OR, an AND gate AND which inputs the pulse signal output from the comparator CMP1 and the comparator CMP2, and outputs ANDs of both the pulse signals as a pulse width modulation signal for stepping up which is a switch signal C, and a negator NOT2 which inverts the pulse width modulation signal for stepping up output from the AND gate AND and outputs as a switch signal D, and is structured such as to use the switch signal A as a control signal for turning on and off the switch A, use the switch signal B as a control signal for turning on and off the switch B, use the switch signal C as a control signal for controlling the switch C, and use the switch signal D as a control signal for turning on and off the switch D.

Figure 6:
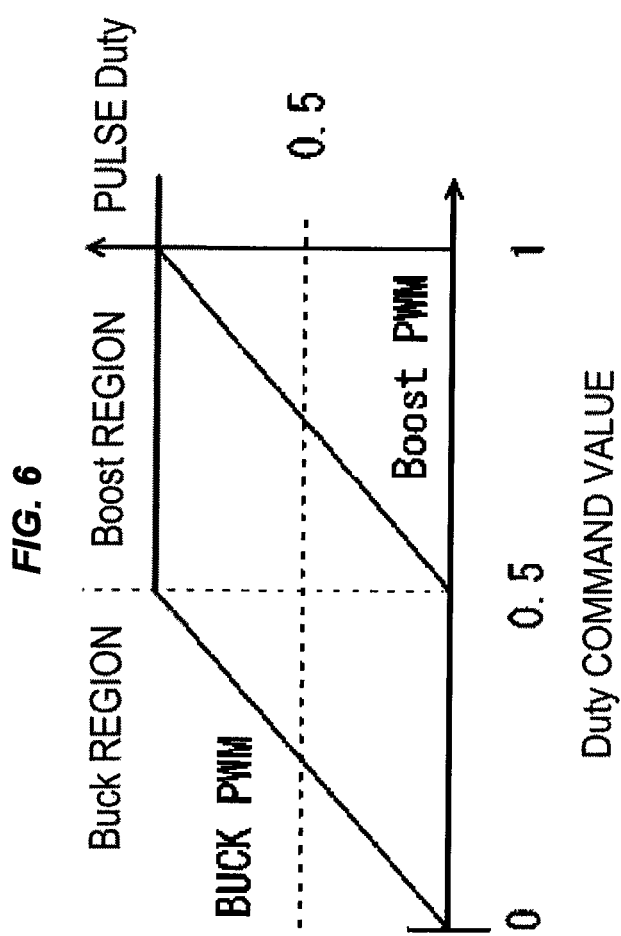
FIG. 6 is a view showing a change of the duty command value at the stepping up time and the stepping down time.

The step-up step-down converter device according to the first embodiment structured as mentioned above generates two pulse width modulated (PWM: PULSE WIDTH MODULATION) pulse signals defining the duty ratio by using a first triangle waveform signal and a second triangle waveform signal which are 180 degrees different in phase from the error signal (Duty command value), uses BUCK PWM which is a logical add (OR) of two pulse signals shown in FIG. 6 as a pulse width modulation signal for stepping down (Buck PWM), and uses Boost PWM which is AND (logical multiplication) of two pulse width modulation signals as a pulse width modulation signal for stepping up (Boost PWM), and two pulse width modulation signals are not simultaneously turned on in the Duty command value less than 0.5. As a result, the Duty command value of the step-up (Boost) PWM is always a value "0", and the step-down (BUCK) PWM which is in proportion to twice the Duty command value is generated. In the case that the Duty command value is equal to or more than 0.5, a period that two pulse width modulation signals are simultaneously turned on is generated, the step-down (BUCK) Duty command value is always a value "1", and the step-up (Boost) PWM which is in proportion to twice the Duty command value is generated.

Figure 2:
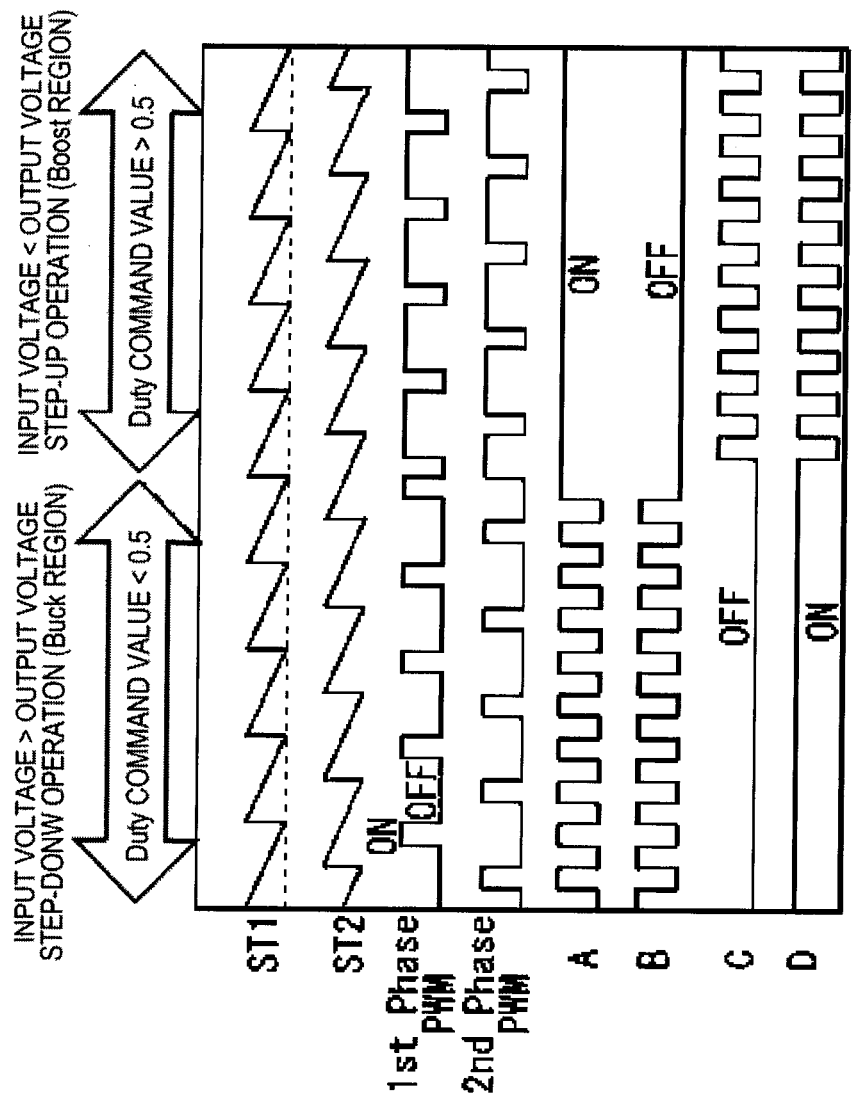
FIG. 2 is a view showing a waveform of the step-up step-down converter device according to the first embodiment.

The step-up step-down converter device according to the present embodiment generates two triangle waveform signals which are 180 degrees different in phase of the oscillation circuits ST1 and ST2, and outputs the $1^{st}$ Phase PWM and the $2^{nd}$ Phase PWM which are the pulse signals obtained by comparing and modifying these two triangle waveform signals and the error signal (Duty value) by the comparators CMP1 and CMP2, and the switch signals A to D controls to turn on and off the switches A to D. Further, as shown in FIG. 2, the switches A and B are alternately turned on and off, the switch C is always turned off, and the switch D is always turned on at the stepping down operation time, and the switch A is always turned on, the switch B is always turned off and the switches C and D are alternately turned on and off at the stepping up operation time. As a result, it is possible to control the step-up and step-down operation without causing any complication of the circuit size, for example, necessity of an inverting amplifier circuit and a reference signal generating circuit.

Second Embodiment

In the embodiment mentioned above, the description is given of the example carrying out the voltage monitoring control which monitors the output voltage and controls to step down and step up the voltage, however, the step-up step-down converter device according to the present invention can carry out a current monitoring control which monitors the electric current in the input side and controls to step down and step up the voltage, and a description will be given of the embodiment with reference to FIGS. 3 and 4.

Figure 3:
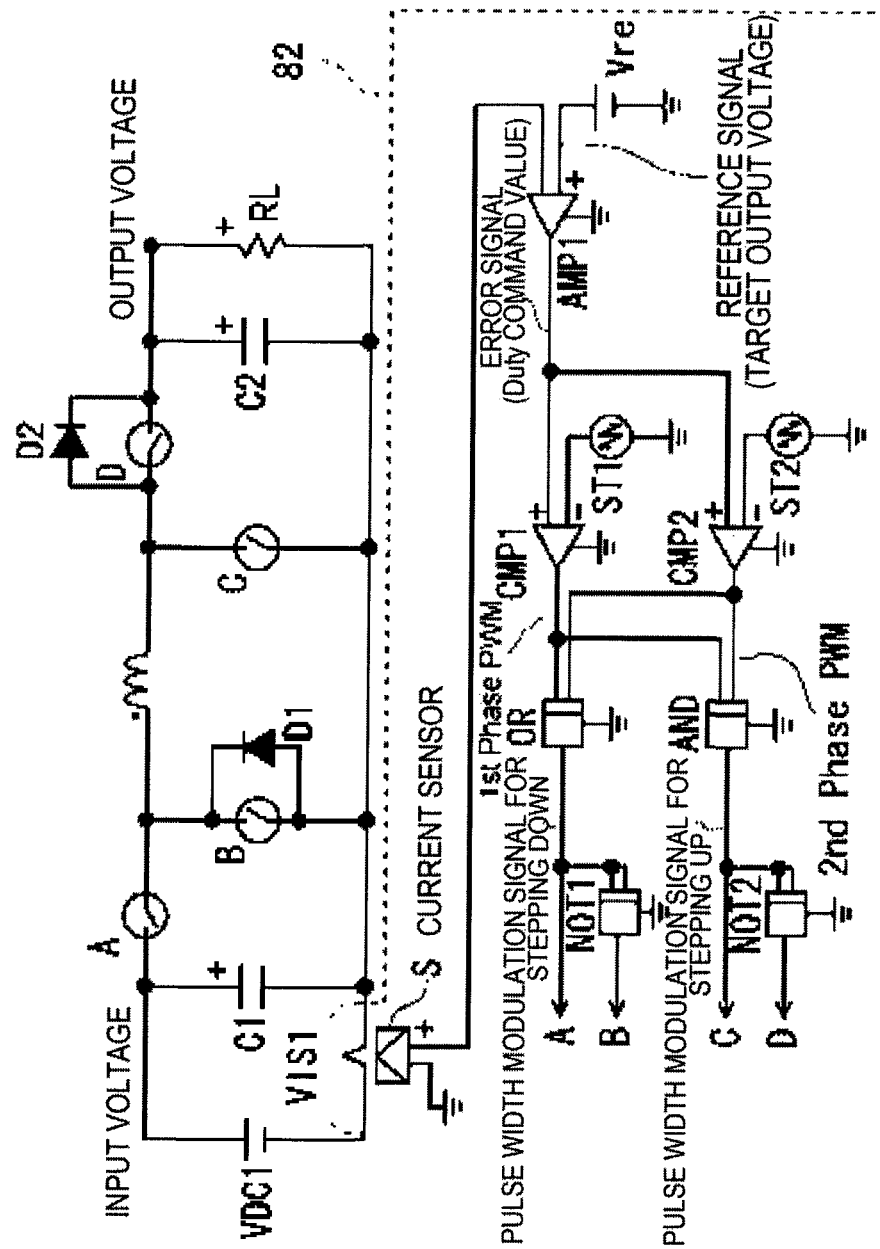
FIG. 3 is a view showing a structure of a step-up step-down converter device at the electric current controlling time according to a second embodiment.
Figure 4:
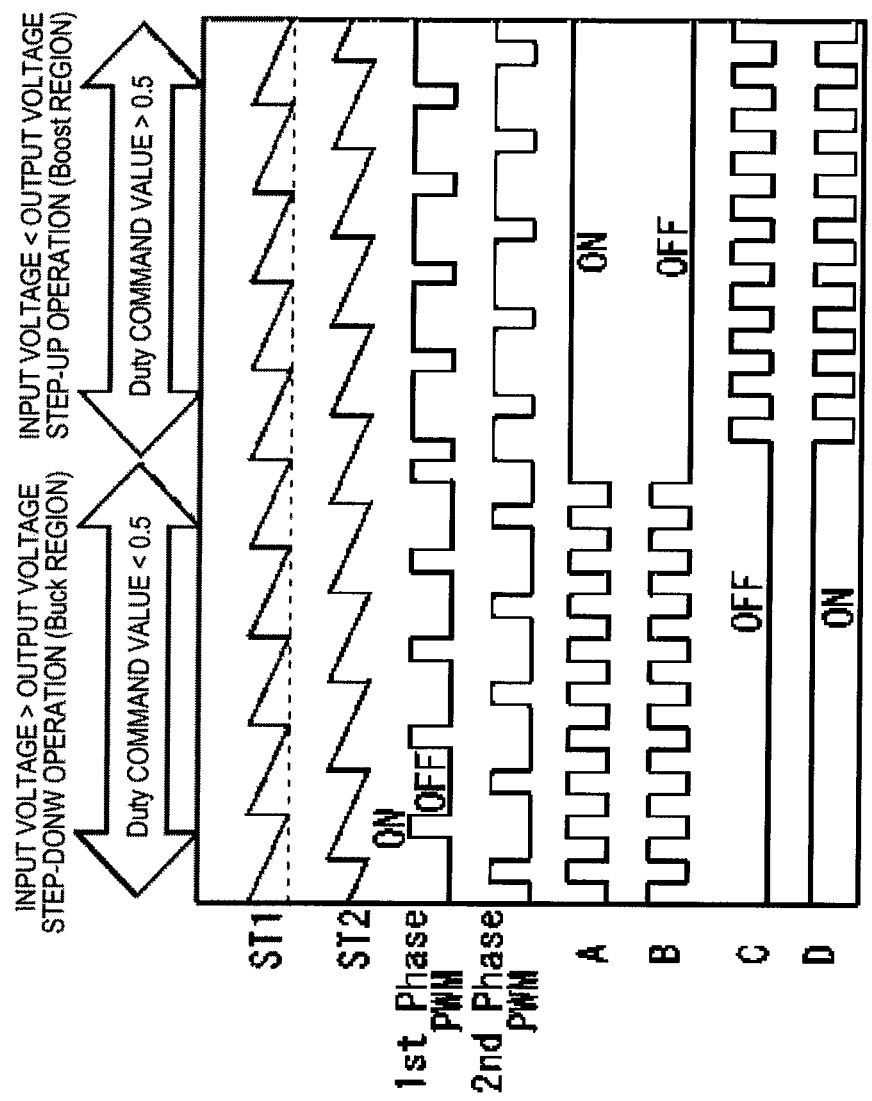
FIG. 4 is a view showing a waveform of the step-up step-down converter device according to the second embodiment.

The step-up step-down converter device according to the present embodiment is structured, as shown in FIG. 3, such as to monitor the input current and keep the input current to a predetermined range, and is provided with two connection circuits which connect in series a switch A, an inductor and a parallel circuit of a switch D and a diode D2 to a positive pole side of a closed circuit constructed between an input direct voltage VDC1 by a solar panel and an output side load via a current sensor S, and connect a positive pole side circuit and a negative pole side circuit of the closed circuit via a capacitor C1 or C2, a connection circuit which connects from between the switch A and the inductor to the negative pole side circuit via a parallel circuit of a switch B and the diode D1, a switch circuit portion having a connection circuit which connects from between the inductor and the switch D to the negative pole side circuit via a switch C, and a control circuit 82 which is connected to the current sensor S detecting the electric current of the input direct voltage VDC1 of the switch circuit portion and controls to open and close the switches A to D, as shown in FIG. 1, and is structured such that the control circuit 82 steps up and steps down the input voltage output from the solar panel to a predetermined range so as to output by monitoring the input current flowing in the current sensor S and controlling to open and close the switches A to D.

The control circuit 82 is provided with a difference amplifier AMP1 which inputs a detection signal detected by the current sensor S to a negative terminal, inputs a target output voltage Vref coming to a reference signal to a positive terminal, and amplifies a difference value between the detection signal and the target input current Vref so as to output as an amplified error signal (Duty command value), an oscillation circuit ST1 which outputs a first triangle waveform signal, a comparator CMP1 which inputs the error signal (Duty command value) output from the difference amplifier AMP1 to the positive terminal, inputs the first triangle waveform signal (the saw tooth signal) from the oscillation circuit ST1 to the negative terminal, and outputs a pulse signal ($1^{st}$ Phase PWM) defining a duty ratio so that the difference between the error signal and the reference signal comes to zero by comparing the error signal (Duty command value) with the first triangle waveform signal, an oscillation circuit ST2 which outputs a second triangle waveform signal which is 180 degrees different in phase from the first triangle waveform signal, a comparator CMP2 which inputs the error signal (Duty command value) output from the difference amplifier AMP1 to the positive terminal, inputs the second triangle waveform signal from the oscillation circuit ST2 to the negative terminal, and outputs a pulse signal ($2^{nd}$ Phase PWM) defining a duty ratio so that the difference between the error signal and the reference signal comes to zero by comparing the error signal (Duty command value) with the second triangle waveform signal, a logical add element OR which inputs the pulse signal output from the comparator CPM1 and the comparator CMP2, and outputs logical adds of both the pulse signals as a pulse width modulation signal (Buck PWM) for stepping down which is a switch signal A, a negator NOT1 which outputs a switch signal B obtained by inverting the switch signal A which is output from the logical add element OR, an AND gate AND which inputs the difference signal output from the comparator CMP1 and the comparator CMP2, and outputs ANDs of both the difference signals as a pulse width modulation signal (Boost PWM) for stepping up which is a switch signal C, and a negator NOT2 which outputs a switch signal D obtained by inverting the switch signal C output from the AND gate AND, and is structured such as to use the first pulse modulation signal as a control signal for turning on and off the switch A, use the switch signal B as a control signal for turning on and off the switch B, use the second pulse modulation signal C as a control signal for controlling the switch C, and use the switch signal D as a control signal for turning on and off the switch D.

The step-up step-down converter device according to the second embodiment structured as mentioned above generates two pulse width modulation (PWM: PULSE WIDTH MODULATION) signals by using a first triangle waveform signal and a second triangle waveform signal which are 180 degrees different in phase from the error signal (Duty command value) based on the input current, and generates a first pulse modulation signal ($1^{st}$ Phase PWM) and a second pulse modulation signal ($2^{nd}$ Phase PWM) shown in FIG. 6.

Even in the step-up step-down converter device according to the present embodiment, the oscillation circuits ST1 and ST2 generate two triangle waveform signals which are 180 degrees different in phase, the comparators CMP1 and CMP2 compare these two triangle waveform signals with the error signal (Duty command value) based on the input current so as to output the $1^{st}$ Phase PWM and the $2^{nd}$ Phase PWM, and the switch signals A to D controls to turn on and off the switches A to D. Further, as shown in FIG. 4, the switches A and B are alternately turned on and off, the switch C is always turned off, and the switch D is always turned on at the stepping down operation time, and the switch A is always turned on, the switch B is always turned off and the switches C and D are alternately turned on and off at the stepping up operation time. As a result, it is possible to control the step-up and step-down operation without causing any complication of the circuit size, for example, necessity of an inverting amplifier circuit and a reference signal generating circuit.

Third Embodiment

The circuit structure of the step-up step-down converter device according to the embodiment shows the basic circuit structure which feeds back the input voltage or the output voltage, however, the actual circuit structure is desirably constructed by using a microcomputer which can set the output signal in relation to the input signal according to a programming, and a description will be given of a third embodiment using the microcomputer.

Figure 7:
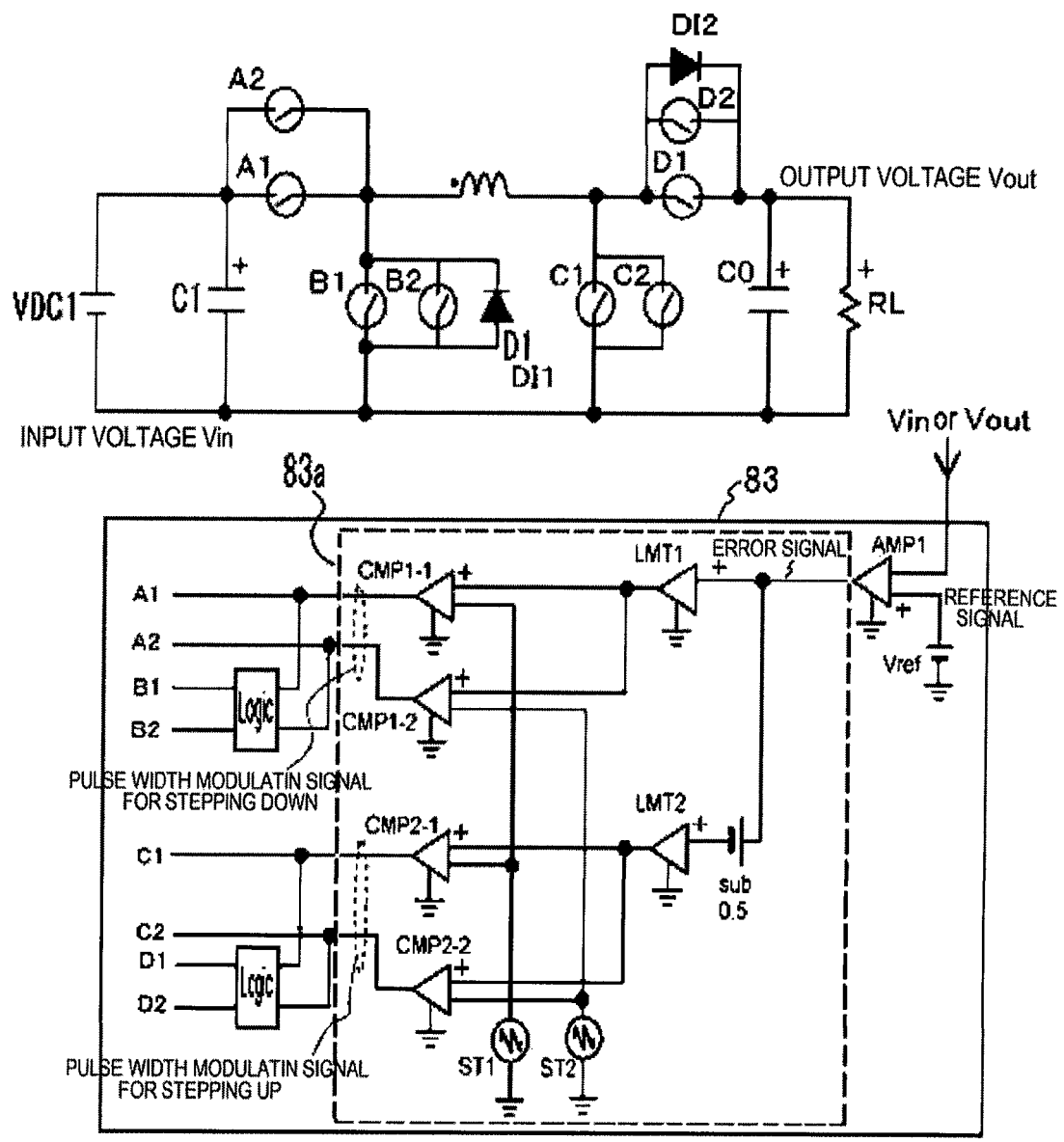
FIG. 7 is a configuration diagram of a step-up step-down converter device according to a third embodiment.

A step-up step-down converter device according to the third embodiment is structured, as shown in FIG. 7, such that the switches A to D in the switch circuit portion in the embodiment mentioned above are changed to switches A1 and A2, switches B1 and B2, switches C1 and C2 and switches D1 and D2 in which the respective switches are arranged in multiple stages and in parallel, and a portion 83*a* shown by a broken line in the control circuit 83 is constructed by a microcomputer which can set the output signal in relation to the input signal according to the programming.

Figure 8:
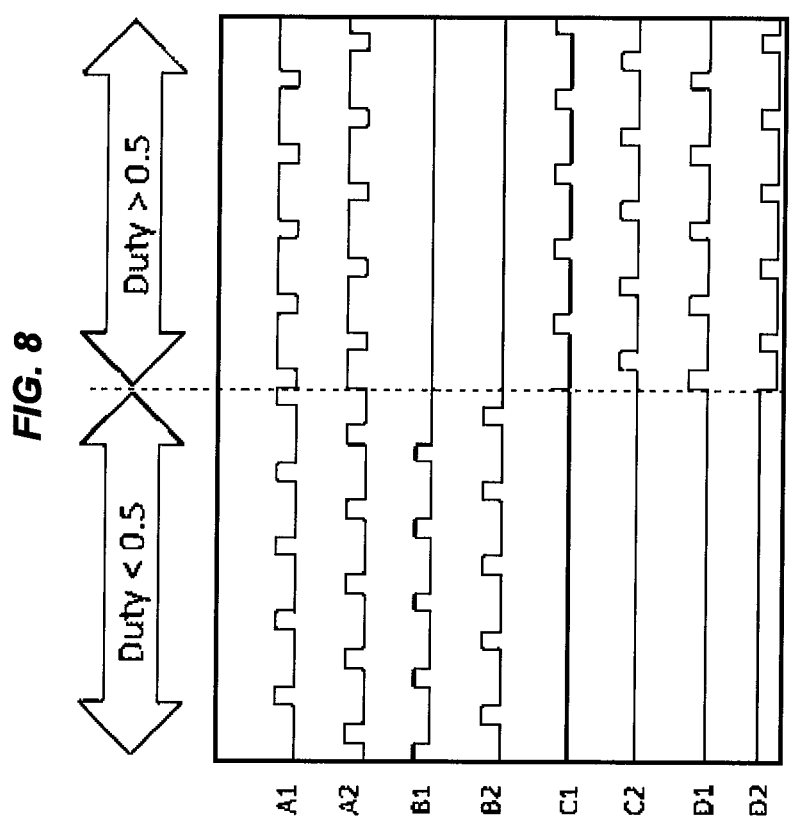
FIG. 8 is a view showing a waveform of the step-up step-down converter device according to the third embodiment.
Figure 9:
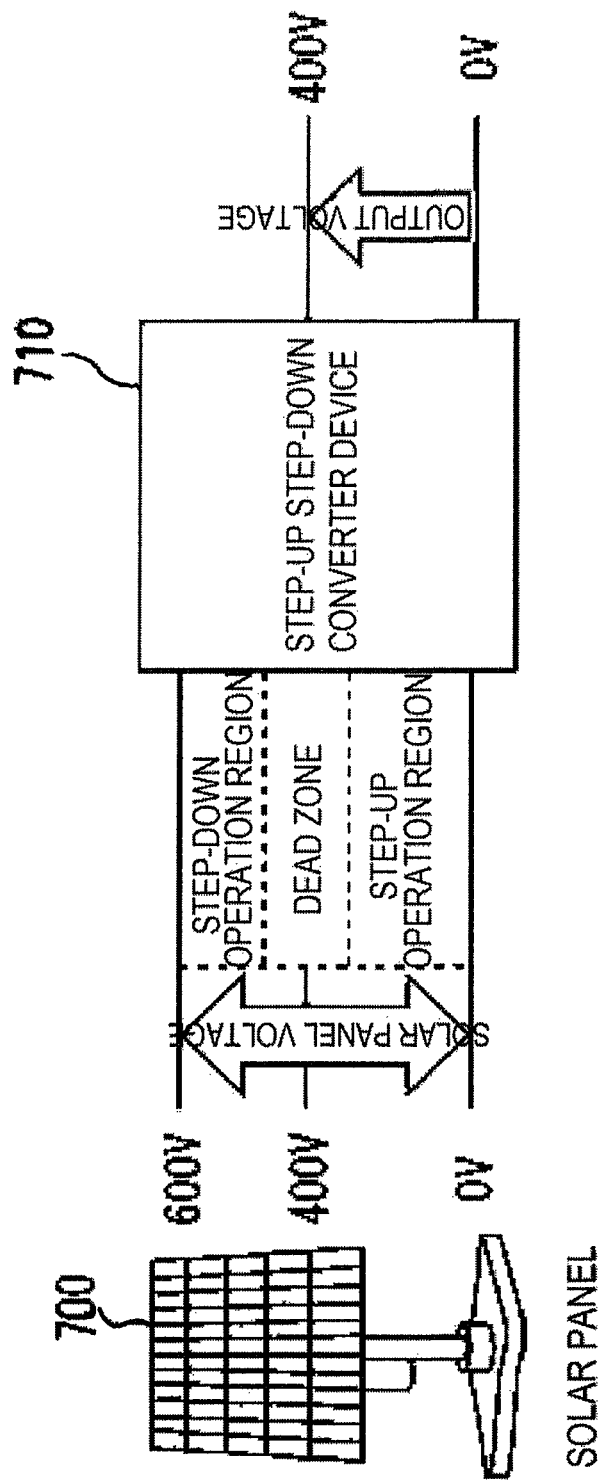
FIG. 9 is a view showing a photovoltaic power generation system.
Figure 10:
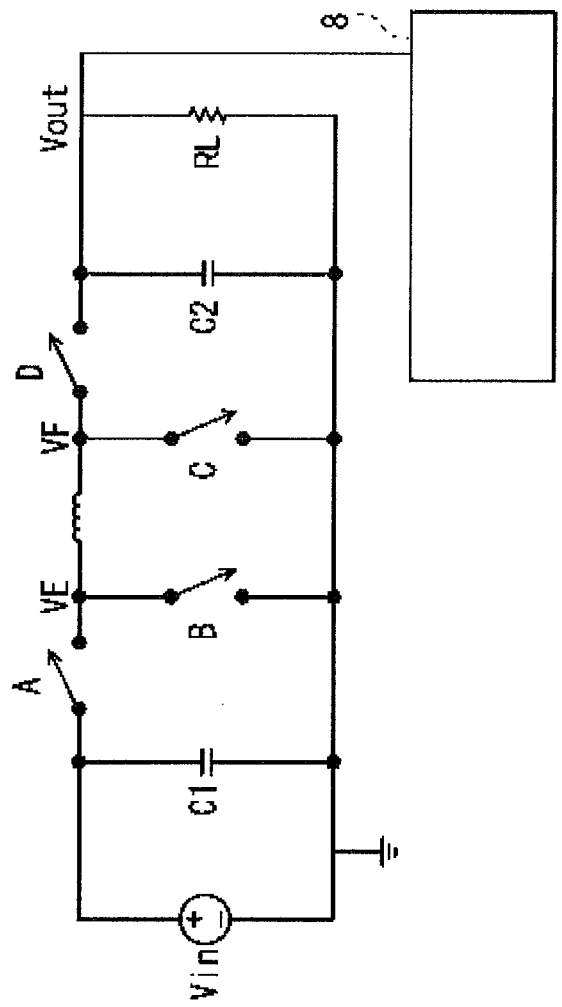
FIG. 10 is a view showing a power generating step-up step-down converter device according to a prior art.
Figure 11:
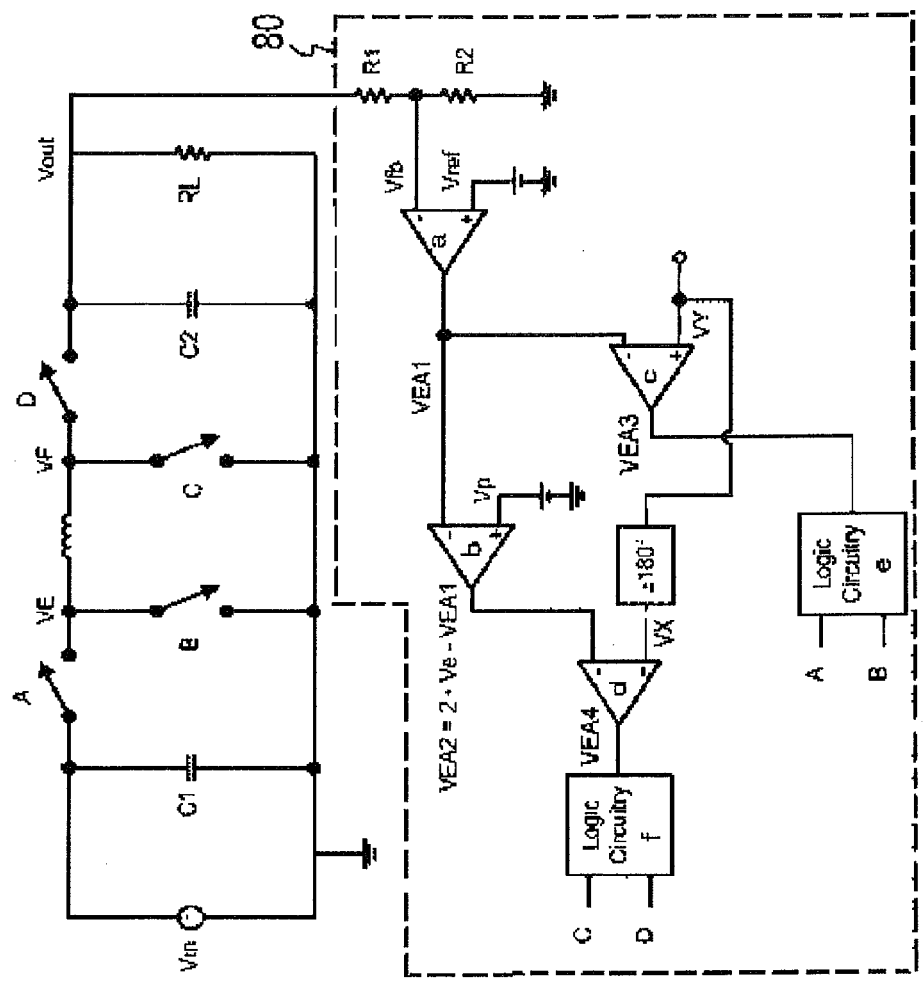
FIG. 11 is a view showing a circuit structure of the power generating step-up step-down converter device according to the prior art.

The control circuit 83 is structured such as to switch the step-down operation and the step-up operation while using the input voltage Vin or the output voltage Vout from the switch circuit portion as an input, and is provided with a difference amplifier AMP1 which compares the input voltage Vin or the output voltage Vout with the reference signal Vref and outputs the difference as the error signal (Duty command value), a microcomputer 83*a* which outputs the pulse width modulation signal (Buck PWM) for stepping down and the pulse width modulation signal (Boots PWM) for stepping up which control to turn on and off a plurality of switches on the basis of the input error signal (Duty command value), and a logical circuit element (LOGIC) which outputs the switch signals A1, A2, B1 and B2 corresponding to the pulse signals for stepping down having different phases shown in FIG. 8 by shifting the phases of the pulse width modulation signal (Buck PWM) for stepping down and outputs the switch signals C1, C2, D1 and D2 corresponding to the pulse signals for stepping down having the different phases shown in FIG. 8 by shifting the phases of the pulse width modulation signal (Boots PWM) for stepping up.

The microcomputer 83a constructs a limiter circuit LMT1 which inputs the error signal (Duty command value) output from the difference amplifier AMP1 to the positive terminal according to the programming, linearly outputs to the error signal in the case that the error signal is within a set range, and outputs an output signal which does not become equal to or more than a set value in the case that the error signal goes beyond the set range, a limiter circuit LMT2 which 0.5 amplifies the error signal (Duty command value) output from the difference amplifier AMP1 so as to input to the positive terminal, linearly outputs to the error signal in the case that the input signal is within the set range, and outputs the output signal which does not become equal to or more than the set value in the case that the input signal goes beyond the set range, an oscillation circuit ST1 which outputs a first triangle waveform (saw tooth wave) signal, an oscillation circuit ST2 which outputs a second triangle waveform signal which is 180 degrees different in phase from the first triangle waveform signal, a comparison circuit CMP1-1 which inputs the output signal of the limiter circuit LMT1 to the positive terminal, inputs the first triangle waveform (saw tooth wave) signal of the oscillation circuit ST1 to the negative terminal, and outputs a difference value, a comparison circuit CMP1-2 which inputs the output signal of the limiter circuit LMT1 to the positive terminal, inputs the second triangle waveform (saw tooth wave) signal of the oscillation circuit ST2 to the negative terminal, and outputs a difference value, a comparison circuit CMP2-1 which inputs the output signal of the limiter circuit LMT2 to the positive terminal, inputs the first triangle waveform (saw tooth wave) signal of the oscillation circuit ST1 to the negative terminal, and outputs a difference value, and a comparison circuit CMP2-2 which inputs the output signal of the limiter circuit LMT2 to the positive terminal, inputs the second triangle waveform (saw tooth wave) signal of the oscillation circuit ST2 to the negative terminal, and outputs a difference value.

The step-up step-down converter device according to the present embodiment generates the step-down pulse signal for the limiter circuit LMT1 carrying out the step-down operation in the range that the error signal (Duty command value) is between 0.5 and 1, generates the step-up pulse signal for the limiter circuit LMT2 carrying out the step-up operation in the range that the error signal is 1 to 0.5 or less, generates the switch signals A1, A2, B1 and B2 mainly turning on and off the switches A1, A2, B1 and B2 while shifting the phase on the basis of the step-down pulse signal by using two triangle waveform signals which are 180 degrees different in phase from the oscillation circuits ST1 and ST2 so as to carry out the step-down operation (only the switch signal D2 is maintained to be on, and generates the switch signals C1, C2, D1 and D2 mainly turning on and off the switches C1, C2, D1 and D2 while shifting the phase on the basis of the step-up pulse signal by using two triangle waveform signals which are 180 degrees different in phase from the oscillation circuits ST1 and ST2 so as to carry out the step-down operation (the switch signals A1 and A2 are turned on and off), as shown in FIG. 8. As a result, it is possible to control to step up and step down without causing any complication of the circuit size, for example, necessity of the inverting amplifier circuit and the reference signal generating circuit.

As mentioned above, the step-up step-down converter device according to the present invention is provided with the switch circuit portion which steps up and steps down the input voltage by turning on and off a plurality of switches so as to output, and the control circuit which the error signal (Duty command value) obtained by comparing the input voltage or the output voltage of the switch circuit portion with the reference signal controls to switch the step-up operation and the step-down operation by the switch circuit portion on the basis of the reference signal, and the control circuit generates the step-down pulse signal and the step-up pulse signal which defines the duty ratio so that the difference between the error signal (Duty command value) and the reference signal comes to zero by the first triangle waveform signal and the second triangle waveform signal, and controls to turn on and off a plurality of switches of the switch circuit portion on the basis of the generated step-down pulse signal and step-up pulse signal. As a result, it is possible to control to step up and step down without any complication of the circuit size, for example, necessity of the inverting amplifier circuit and the reference signal generating circuit.

Figure 5:
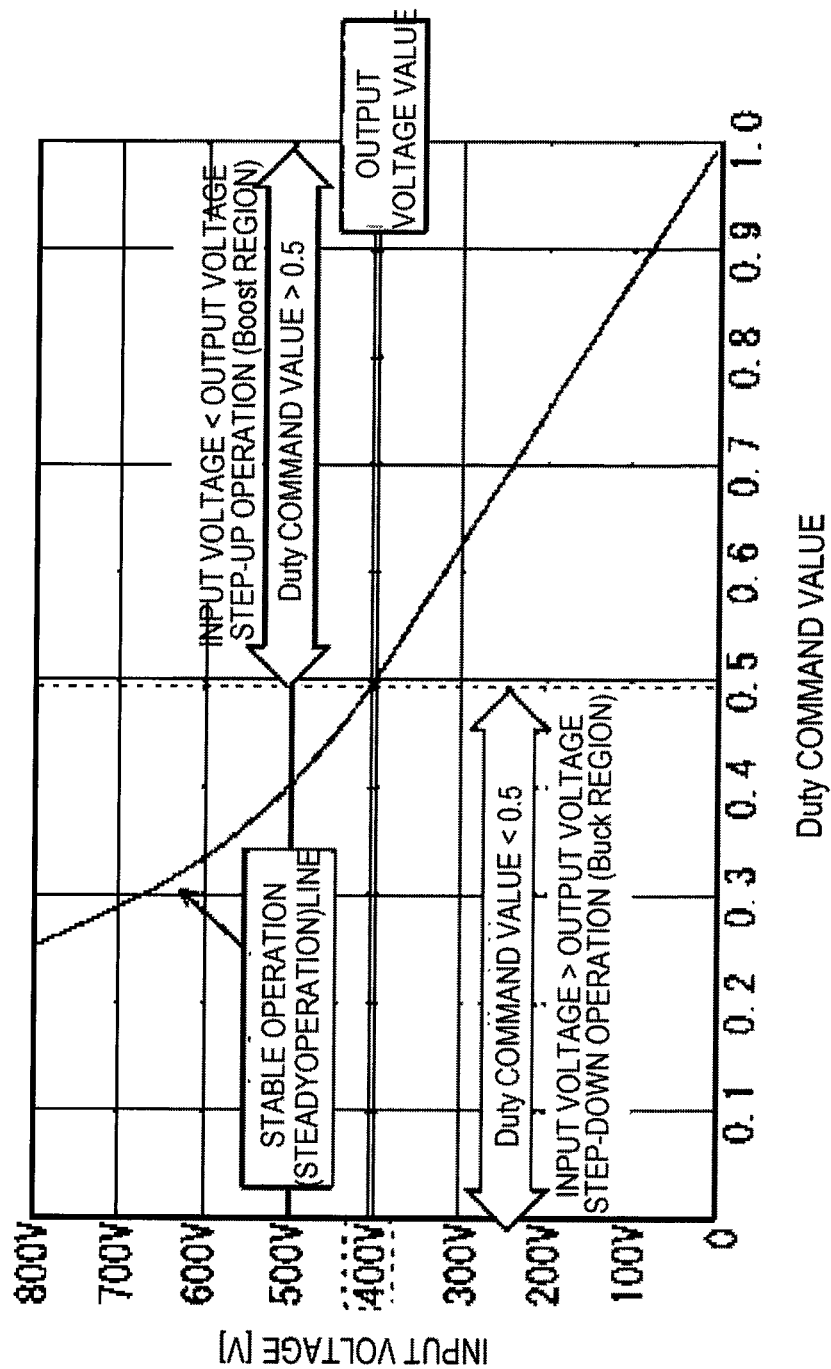
FIG. 5 is a view showing a relationship between an input voltage and a duty command value.

As mentioned above, in the step-up step-down converter device according to the embodiment of the present invention, the Duty command value continuously increases from 0 to 0.5 in the state in which the input voltage is larger than the output voltage in the case that the input voltage changed between 0 V and 600 V, and the Duty command value continuously increases from 0.5 to 1.0 in the state in which the input voltage is smaller than the output voltage, as shown in FIG. 5, whereby the Duty command value changes so as to coincide with a stable operation (a steady operation) line. As a result, it is possible to prevent the dead zone from being generated, and it is possible to control to step up and step down without any complication of the circuit size.

What is claimed is:

1. A step-up step-down converter device comprising:
   a switch circuit portion which steps up and steps down an input voltage by switching on-off operations of a plurality of switches for stepping up voltage and a plurality of switches for stepping down voltage in order to provide an output; and
   a control circuit which switches and controls a step-up and step-down operation by the switch circuit portion on a basis of an error signal obtained by comparing the input voltage or an output voltage of said switch circuit portion with a reference signal,
   wherein said control circuit is provided with a first oscillation circuit which outputs a first triangle waveform signal, and a second oscillation circuit which outputs a second triangle waveform signal having a phase which is 180 degrees different from said first triangle waveform signal, wherein said control circuit generates a step-down pulse signal and a step-up pulse signal in which a duty ratio is defined by the first triangle waveform signal and the second triangle waveform signal, and controls so as to turn on and off a plurality of switches of the switch circuit portion on a basis of the generated step-down pulse signal and step-up pulse signal,
   said control circuit including a logic element which receives as inputs the step-down pulse signal and the step-up pulse signal, and outputs a logical sum thereof as a first switch control signal,
   said control circuit further including a negator which outputs a second switch signal obtained by inverting the first switch control signal,
   said control circuit also including an AND gate which receives as inputs the step-down pulse signal and the step-up pulse signal and outputs a third switch signal, said control circuit additionally including a negator which inverts the third switch signal output from said AND gate and outputs a fourth switch signal.

2. A step-up step-down converter device comprising:

a first switch (A), an inductor and a parallel circuit of a fourth switch (D) and a second diode (D2) connected in series to a closed circuit between a source of fluctuating input direct voltage and an output side load, a positive pole side circuit and a negative pole side circuit of said closed circuit being connected via a first or second capacitor (C1, C2);

a connection circuit which connects from between said first switch (A) and the inductor to the negative pole side circuit via a parallel circuit of a second switch (B) and a first diode (D1);

a connection circuit which connects from between said inductor and the fourth switch (D) to the negative pole side circuit via a third switch (C);

a control circuit which is connected to said output side load and which controls said first to fourth switches to turn on and off; and said control circuit stepping up and stepping down said input direct voltage to a predetermined range in order to provide an output by monitoring an output voltage of the output side load and controlling the first to fourth switches to turn on and off, wherein said control circuit comprises:

a first amplifier which receives at a negative input terminal the output voltage (Vout) supplied to the output side load, receives at a positive input terminal a target output voltage (Vref) in the form of a reference signal, and amplifies a difference value between the output voltage (Vout) and the target output voltage so as to output an error signal;

a first oscillation circuit which outputs a first triangle waveform signal;

a first comparator which receives at a positive input terminal the error signal output from said first amplifier, receives at a negative input terminal the first triangle waveform signal from said first oscillation circuit, and compares said error signal with the first triangle waveform signal so as to output a pulse signal;

a second oscillation circuit which outputs a second triangle waveform signal having a phase which is 180 degrees different from said first triangle waveform;

a second comparator which receives at a positive input terminal the error signal output from said first amplifier, receives at a negative input terminal the second triangle waveform signal from said second oscillation circuit, and compares said error signal with the second triangle waveform signal so as to output a pulse signal;

a logic element which receives as inputs the pulse signals output from said first comparator and the second comparator, and outputs a logical sum of the pulse signals as a first pulse modulation signal;

a negator which outputs a second switch signal obtained by inverting the first pulse modulation signal output from said logic element;

an AND gate which receives both of the pulse signals output from said first comparator and the second comparator and outputs a third switch signal; and a negator which inverts the third switch signal output from said AND gate and outputs a fourth switch signal, and wherein said control circuit sets said first pulse modulation signal as a control signal for turning on and off the first switch, sets said second switch signal as a control signal for turning on and off the second switch, sets said third switch signal as a control signal for controlling the third switch, and sets said fourth switch signal as a control signal for turning on and off the fourth switch, turns off the third switch and turns on the fourth switch as well as alternately turning on and off the first switch and the second switch at a step-down operation time, and alternately turning on and off the third switch and the fourth switch as well as turning on the first switch and turning off the second switch at a step-up operation time.

3. A step-up step-down converter device comprising:

a first switch (A), an inductor and a parallel circuit of a fourth switch (D) and a second diode (D2) connected in series to a closed circuit between a source of fluctuating input direct voltage and an output side load, a positive pole side circuit and a negative pole side circuit of said closed circuit being connected via a first or second capacitor (C1, C2);

a connection circuit which connects from between said first switch (A) and the inductor to the negative pole side circuit via a parallel circuit of a second switch (B) and a first diode (D1);

a connection circuit which connects from between said inductor and the fourth switch (D) to the negative pole side circuit via a third switch (C);

a control circuit which is connected to a current sensor detecting an electric current of said input direct voltage and controls said first to fourth switches (A-D) to turn on and off; and said control circuit stepping up and stepping down said input direct voltage to a predetermined range in order to provide an output by monitoring an input voltage and controlling the first to fourth switches (A-D) to turn on and off, wherein said control circuit comprises:

an amplifier which receives at a negative input terminal the electric current detected by said current sensor, receives at a positive input terminal a target output voltage in the form of a reference signal, and amplifies a difference value between the detection current and the target output voltage so as to output an error signal;

a first oscillation circuit which outputs a first triangle waveform signal;

a first comparator which receives at a positive input terminal the error signal output from said amplifier, receives at a negative input terminal the first triangle waveform signal from said first oscillation circuit, and compares said error signal with the first triangle waveform signal and outputs a pulse signal;

a second oscillation circuit which outputs a second triangle waveform signal having a phase which is 180 degrees different from said first triangle waveform;

a second comparator which receives at a positive input terminal the error signal output from said amplifier, receives at a negative input terminal the second triangle waveform signal from said second oscillation circuit, and compares said error signal with the second triangle waveform signal and outputs a pulse signal;

a logical add element which receives as the pulse signals output from said first comparator and the second comparator, and outputs a logical sum of the pulse signals as a first pulse modulation signal;

a first negator which outputs a second switch signal obtained by inverting the first pulse modulation signal output from said logical add element;

an AND gate which receives as inputs the pulse signals output from said first comparator and the second comparator and outputs a third switch signal; and a negator which outputs a fourth signal obtained by inverting the third signal output from said AND gate, and wherein said control circuit sets said first pulse modulation signal as a control signal for turning on and off the first switch, sets said second switch signal as a control signal for turning on and off the second switch, sets said third switch signal as a control signal for controlling the third switch, and sets said fourth switch signal as a control signal for turning on and off the fourth switch, turns off the third switch and turns on the fourth switch as well as alternately turning on and off the first switch and the second switch at a step-down operation time, and alternately turning on and off the third switch and the fourth switch as well as turning on the first switch and turning off the second switch at a step-up operation time.

* * * * *